J. W. CULMER.
COMPUTING SCALE.
APPLICATION FILED NOV. 20, 1895. RENEWED APR. 30, 1904.
999,722.
Patented Aug. 1, 1911.
2 SHEETS—SHEET 1.
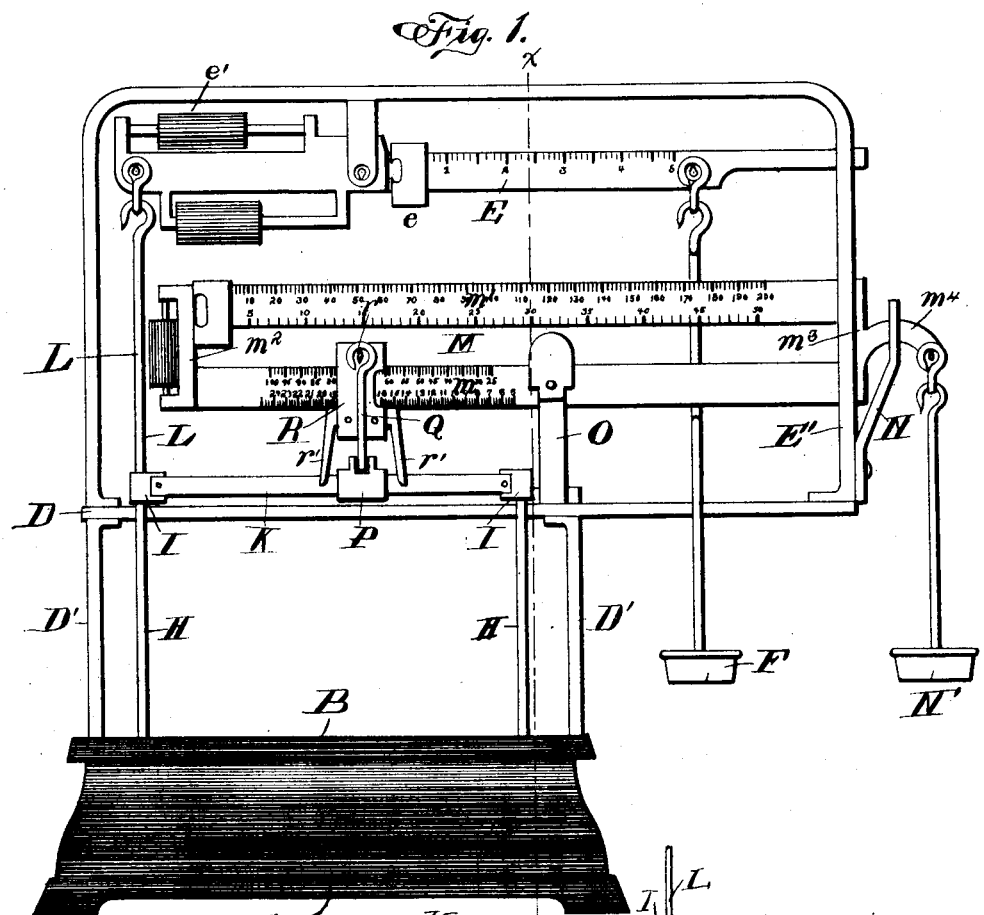
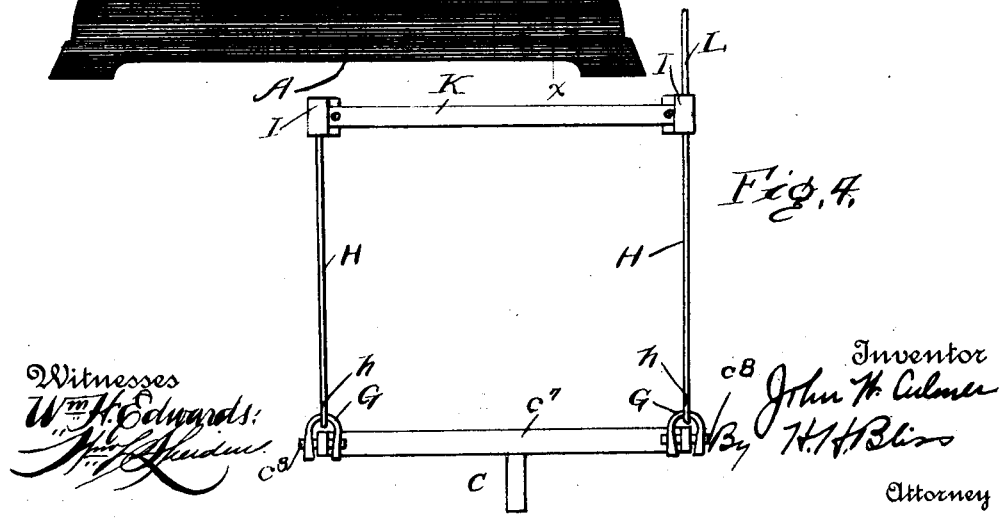

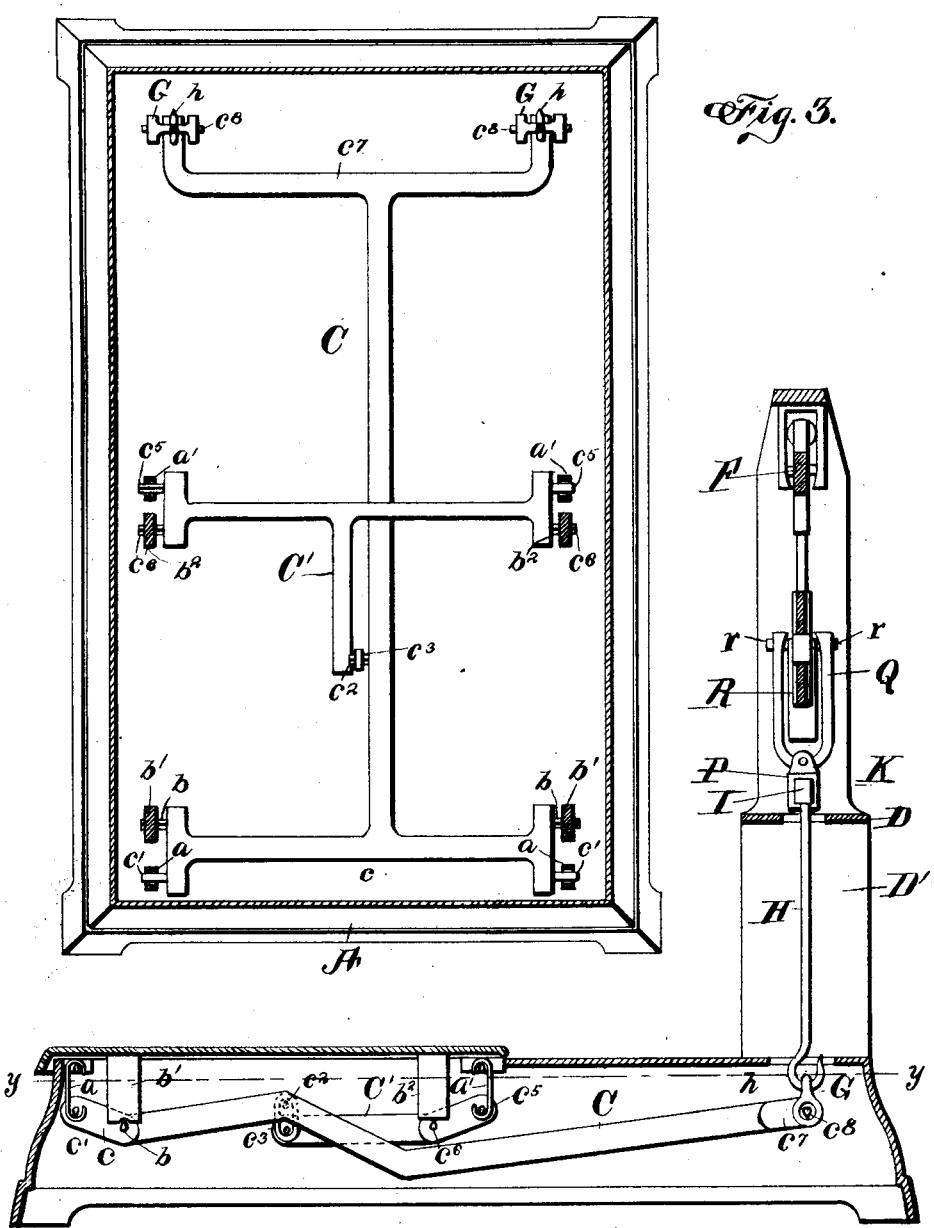

UNITED STATES PATENT OFFICE.

JOHN W. CULMER, OF NEW BRIGHTON, PENNSYLVANIA, ASSIGNOR, BY MESNE ASSIGNMENTS, TO NATIONAL SCALE COMPANY, A CORPORATION OF PENNSYLVANIA.

COMPUTING-SCALE.

999,722. Specification of Letters Patent. Patented Aug. 1, 1911.

Application filed November 20, 1895, Serial No. 569,493. Renewed April 30, 1904. Serial No. 205,825.

*To all whom it may concern:*

Be it known that I, JOHN W. CULMER, a citizen of the United States, residing at New Brighton, in the county of Beaver and State of Pennsylvania, have invented certain new and useful Improvements in Computing-Scales; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in combined weight and price scales, particularly of that class in which the motion of the weight supporting levers is transmitted to the computing, or price, beam through a connection adapted to move along a pivotally supported rod, having its pivots parallel to the pivots of the weight supporting levers, and lying below and parallel to the computing beam.

In the accompanying drawings: Figure 1 is a front elevation of a scale embodying my improvements; Fig. 2 is a vertical sectional view on the line $x$—$x$ of Fig. 1. Fig. 3 is a plan view, partly in section on the line $y$—$y$ of Fig. 2; Fig. 4 is a rear elevation of the connection between the weight supporting levers and the pivoted supporting rod or bar for the poise on the computing, or price, beam of the scale.

Like letters of reference designate corresponding parts in the several figures of the drawing, referring to which:—

A designates the base of the scale, B the weight sustaining platform, C, C' the main and supplemental weight supporting levers, D a cap supported from the base by standards D', E the weighing beam supported within a frame mounted on the cap piece D, provided with a swinging poise F, sliding poise $e$, and gravity ball $e'$, and connected with the main lever C.

The above described parts constitute an ordinary weighing scale.

As shown in Fig. 3, the main lever C is preferably provided at its rear end with a cross piece $c$ having at its ends projecting pivot or fulcrum lugs $c'$ adapted to fit into loops $a$ on the base A; and also with bearing lugs $b$ for supporting the rear portion of the platform B, through depending arms $b'$. At an intermediate point of its length the main lever is provided with a laterally projecting lug $c^2$, which is connected, by means of a loop $c^3$ with a corresponding lug situated near the rear end of the supplemental lever C', the forward end of such lever having pivot or fulcrum lugs $c^5$ adapted to be supported in loops $a'$ on the base A. The forward portion of the platform B is supported by arms $b^2$ resting on lugs $c^6$ on said supplemental lever. The cross piece $c^7$ at the forward end of the main lever C has its ends bent to extend substantially at right angles to the body thereof and each end has lugs $c^8$ extending parallel to the bearing lugs $b$ and extending into loops G. With the loops G engage hooks $h$ at the lower ends of rods or links H, the upper ends of which are screwed into, or otherwise connected to, blocks I. These blocks I are connected by a transverse bar K, hereinafter referred to as the "trolley bar", and one of them is also connected, by means of a rod or link L, with the aforesaid weight beam E. The poise F is of such weight to balance the platform and other parts connected with the levers C, C', about the pivot or fulcrum of the beam E, when the parts are in the positions shown in Fig. 1.

Upon the cap pieces D, I mount a computing, or price, beam, designated as a whole by M. This beam consists of two parallel bars $m$, $m'$, connected at their ends by bars $m^2$, $m^3$, from the latter of which a curved arm $m^4$, projects through a bridle N, secured to the frame E', and has connected to its free end a poise N'. As shown, the computing beam is mounted in a support or standard O and is parallel to the above described trolley bar K.

A sliding poise R, adapted to be moved longitudinally of the lower member $m$ of the computing beam, is connected with the trolley, and the weight thereof and of such connections are balanced in connection with the platform, B, levers C, C', and connected parts, by the poise F.

As shown, a sliding block P is fitted on the trolley bar and is connected by loop Q with the pivot lugs $r$ projecting from the sliding poise R. The poise R is adapted to be secured in any desired position on the computing beam by means of fingers $r'$ pivoted thereto and adapted to engage with the lower edge of the beam. These fingers extend across the horizontal planes of the guide bar sleeve and somewhat near to the ends thereof, and consequently when the operator presses against the fingers to release the head block, the lower ends of the fingers engage with the sleeve and act to center it with respect to the head block and to keep it in central position when the block is being moved along the price beam and leave it in such central position when the block is set at any desired point. The manner of graduating and using the price or computing beam will be readily understood and will therefore not be described here.

One of the objects of the present invention is to provide a computing scale which shall retain many of the desirable features which I have employed in manufacturing them, but in which the draft shall be exerted directly, practically, from the weight carrying lever upon the computing beam, that is to say, without requiring the intervention of one or more levers each with a fixed fulcrum between the platform lever and the beam. And this is accomplished by the mechanism herein shown and described. The guide K is connected directly with the rising and falling end of the platform lever or weight carrying lever and rises and falls with it in horizontal parallelism, that is to say, so that the guide will in each of its positions be substantially parallel to the horizon. This guide is allowed to move axially with relation to the platform lever because of the knife edge or pivotal connection between them; and it is held in proper position by means of the link or rod extending down from the weighing beam. This weighing beam is thus available not only for indicating the weight of the article on the platform, but also for counterbalancing the draft transmitter or laterally adjustable connecting device. The guide bar, its supports, the platform lever, and the platform itself. When I herein refer to a "weight beam", I mean one capable of the use for which that at F is capable, in that it can indicate weights in pounds and ounces simultaneously with or independently of the operation of the parts which indicate unit price and total value. By employing the legs or supports H, the guide bar K can be placed in proximity to the computing beam, and the draft transmitter can be short so that it can be readily moved laterally without cramping or binding. But the distance of the platform lever C from the guide bar can be varied under different circumstances and the lengths of the parts H be correspondingly varied without altering the material features of the construction.

By having the computing beam mounted substantially at its center longitudinally, I am enabled to place the guide bar K and the connecting device directly back of the platform, that is to say, so that they shall lie in the longitudinal vertical planes of the platform, and thereby make the mechanism, as a whole, more compact, and insure its being held level in all of its parts.

I do not herein specifically claim a scale of the character described having in combination with the computing beam, the platform levers and the intermediate trolley devices between the platform levers and the computing beam, of a supplemental weight beam when it is situated within the base and is adapted to counterbalance more or less of the other parts, as I have made a construction of that character the subject-matter of another application, filed by me June 20th, 1896. But with the present construction, as is above described not only can the supplemental beam be used for counterbalancing numerous other parts, but also, by means of its graduations and its poise, indicate weight in pounds and ounces.

I am aware of the fact that it has been proposed to make a computing scale with parts more or less similar to those herein shown, such proposal appearing for instance in Patent No. 790,794, to Ira C. Koehne, dated May 23, 1905, but in which there was radical difference with respect to important parts. In the proposed scale referred to the frame forming one of the connecting parts between the platform levers and the price beam had a horizontal guide track and a vertical leg at one end secured rigidly thereto and a vertical leg at the other end secured to the guide track by a horizontal pivot, said leg also serving as the connecting link of a steelyard structure comprising a weigh beam or tare beam at the top of the scale which is connected to the platform lever by this leg pivotally united to the guide track; the track being thus loosely pivoted to the steelyard rod in such manner as to permit a limited vertical swinging movement of the track bar. Such pivotal connection of the track bar with the legs, or either of them, is the source of inaccuracy in the scale, as it permits the pivoted end of the track or guide bar to rise or fall and thus be thrown out of horizontal parallelism with the price beam.

In my case, the frame which is pivoted to and extends upward from the platform levers and comprising the track bar and the two leg parts extending downward therefrom is rigid throughout, that is to say, the track bar or guide bar is rigidly secured at both ends to its legs, and is held at all times in horizontal parallelism, and parallel to the axis of the knife edges of the platform lever.

I do not herein claim the specific subject-matter presented in the claims in my application, Serial No. 264,687, filed June 10, 1905, as a division of the present application for patent as originally filed, the claims in the said divisional application relating to the flexible connection for the guide bar or guide frame between the horizontal guide bar or track bar for the trolley and the tare bar or its equivalent.

What I claim is:

1. In a computing scale, the combination with the platform, the platform levers, the weight beam, the computing beam, and the guide bar, of the draft transmitting device having a sleeve which entirely encircles the guide bar, a head block or sleeve which entirely encircles the price bar of the computing beam, the loop or stirrup having an arm in front of the head block and an arm in rear thereof, and pivotally connected to the sleeve which encircles the guide bar, and beam engaging fingers $r'$ pivoted to the head block and extending across the horizontal planes of the guide bar sleeve, substantially as set forth.

2. In a price indicating scale, the combination of a price beam, a platform lever having a widened end, a connecting frame directly hinged to the widened end of the lever at its two extremities, said frame having a horizontal part and two vertical legs each rigidly connected to the horizontal part, and suitable connections between the frame and the price beam, said horizontal part of the frame being above the platform lever and arranged substantially as set forth whereby the said connections can be placed in relatively elevated horizontal planes.

3. In a price indicating scale, the combination of the price beam, the connecting frame having a horizontal bar adapted to rise and fall in horizontal parallelism, and two legs each rigidly connected with the horizontal bar and arranged to rise and fall bodily with said bar, suitable connections between the frame and price beam, and the platform lever having a pair of knife edge connections at one end with the platform framework, and a pair of knife edge connections with said connecting frame at the opposite end.

4. In a price indicating scale, the combination of the price beam fixed against longitudinal movement, a platform lever, a frame pivotally connected with said platform lever at two points, said frame having a horizontal bar rising and falling in horizontal parallelism and two legs each rigidly secured to the horizontal bar and rising and falling bodily with said bar, a slidable connective member between said frame and said price beam, and means for raising said frame, substantially as set forth.

5. In a price indicating scale, the price beam, the platform lever, the frame in pivotal engagement with the platform lever and having a horizontal guide bar, and suitable connections between the frame and price beam, said frame having its parts rigidly secured together whereby its has pivotal movement in one direction only in planes transverse to the plane of the price beam, and arranged to have its horizontal guide bar rise and fall in horizontal parallelism.

6. In a price indicating scale, the combination of the scale framework, the price beam fixed against horizontal movement, the platform lever, the frame pivotally connected with said platform lever, said frame having its vertical and its horizontal parts rigidly secured together, the slidable connective element between said frame and said price beam, the tare beam suitably mounted in said framework of the scale, and link connections between said tare beam and said frame.

7. A price scale comprising in combination the fulcrumed price beam having a value poise thereon, the supporting mechanism for the article to be weighed embodying knife edged pivots, the track mounted to have a free vertical movement adjacent to said price beam, said track having vertical rods at opposite ends each rigidly connected to the track and connecting with said knife edged pivots on the supporting mechanism for the article to be weighed, the variable connection between said track and said price beam, and the lever E adapted to counter-balance said track and said variable connection.

In testimony whereof I affix my signature, in presence of two witnesses.

JOHN W. CULMER.

Witnesses:
C. W. MORRISON,
G. L. EBERHART.